United States Patent Office
3,527,673
Patented Sept. 8, 1970

3,527,673
SYNTHESIS OF STEROIDS
Saul L. Neidleman, Lawrence Township, N.J., assignor to E. R. Squibb & Sons, Inc., New York, N.Y., a corporation of Delaware
No Drawing. Filed Jan. 26, 1968, Ser. No. 700,706
Int. Cl. C07c 167/00
U.S. Cl. 195—51                                    3 Claims

ABSTRACT OF THE DISCLOSURE

This invention relates to a new process for preparing halo steroids. These steroids are prepared by interacting the corresponding steroid having the enolic ether structure

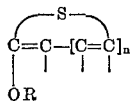

wherein S is a steroid residue and R is acyl or lower alkyl and N is 0 or 1 with a halogenating agent in the presence of a microorganism of the genus Caldariomyces or enzymes thereof The halo-keto steroids formed are useful as anabolic agents if of the androstane series, progestational agents and anti-inflammatory agents if of the pregnane series, and estrogenic agents if of the estrane series. The compounds of this invention are also useful as emulsifying agents.

---

This invention relates to a new process for synthesizing steroids and to certain new steroids formed thereby.

In its broadest aspects, the new process of this invention entails reacting an enolic ether of the Formula I

(I)

wherein R and S are as defined above with a halogen in the presence of a microorganism of the genus Caldariomyces or enzymes thereof, whereby the corresponding halo-keto steroid is formed. This process can be depicted generally by the formula:

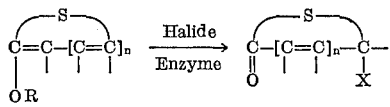

wherein S and R are as defined above and X is halogen, e.g., bromo, chloro or iodide and $n$ is 0 or 1.

Any steroid containing an enolic ether structure

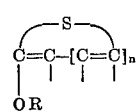

wherein S and R are as defined herein can be utilized as a starting material in the process of this invention. Among the position substitutions in steroids that can be mentioned are the $\Delta^{16}$-17-acyloxys; $\Delta^{16}$-17-alkyloxys; $\Delta^{3}$-3-alkyloxys; $\Delta^{3}$-3-acyloxys; $\Delta^{2}$-3-alkyloxys; $\Delta^{2}$-3-acyloxys; and $\Delta^{3,5}$-3-acyloxys or alkyloxys.

By lower alkyl is included hydrocarbons having up to six carbon atoms such as methyl, ethyl, propyl, isopropyl, n-butyl, iso-butyl, tertiary butyl and hexyl.

Illustrative of the acyl groups which may be present are inorganic esters such as sulfate and phosphate (in particular, at C-21) as well as acid residues of hydrocarbon carboxylic acids having up to twelve carbon atoms, including lower alkanoates such as formate, acetate, propionate, n-butylate, iso-butylate, valerate, iso-valerate, caproate (n-hexanoate); aromatic acyl residues such as benzoate and toluate, as well as the acyl portions of dibasic acids such as succinate and phthalate.

Examples of steroids having the structure of Formula I which may be utilized in the practice of the invention are:

16-dehydroestradiol 3-methyl ether 17-acetate;
3,17$\beta$-diacetoxy-5$\beta$-androst-3-ene;
3,17$\beta$-diacetoxyandrosta-3,5-diene;
3,17$\beta$-diacetoxy-5$\alpha$-androst-2-ene;
3$\alpha$,17-diacetoxy-5$\alpha$-androst-16-ene;
3$\beta$,17-diacetoxyandrost-5,16-diene;
2,17$\beta$-diacetoxy-5$\alpha$-A-norandrost-1-ene;
3-methoxypregna-3,5-diene-20-one;
3-methoxyandrosta-3,5-diene-17-one; and
3-ethoxy-17$\beta$-hydroxyandrosta-3,5-diene.

The process of this invention essentially comprises subjecting the desired enolic ether steroid under aerobic conditions to the action of a halogenating enzyme and a halide salt in the presence of hydrogen peroxide.

As a source of the halogenating enzyme, the microorganism *Caldariomyces fumago* may be used. The microorganism can be grown as a static culture on Czapek-Dox medium at room temperature for five to seven days. The mycelial pads are collected and stored in a deep-freeze for subsequent use. The halogenating enzyme is prepared as a supernatant from an aqueous homogenate of the mycelial pads of the microorganism.

In addition to the halogenating enzyme, hydrogen peroxide must also be present in the reaction mixture. Although hydrogen peroxide itself may be added to the mixture, the hydrogen peroxide may be prepared in situ by use of a peroxide producing enzyme system. Such enzyme systems are well known in the art and include glucose oxidase in the presence of glucose, D- and L-amino acid oxidases in the presence of D- or L-methionine, and diamine oxidase in the presence of histamine. Although substantially any concentration of hydrogen peroxide may be used, preferably the hydrogen peroxide is present in a molar ratio of about 0.1 to 1 to about 100 to 1 (optimally about 1 to 1 to about 10 to 1) based on the weight of the steroid. If a peroxide producing enzyme system is used, the concentration of the enzyme is so adjusted to yield the same concentration of hydrogen peroxide as stated above.

The reaction is preferably conducted at a pH in the range of about 2.2 to about 6 (optimally about 2.2 to about 4 and most advantageously at pH 3.0 in the presence of hydrogen peroxide and about 4 to about 6, most advantageously at pH 5 in the presence of enzymatically produced hydrogen peroxide). To assure that the pH of the reaction mixture is maintained in this range, a buffering agent which buffers in the desired pH range is preferably also added to the reaction medium. Suitable buffers include McIlvaine's buffer, potassium citrate buffer, sodium acetate buffer, potassium phosphate buffer and potassium formate buffer.

The reaction is carried out in an aqueous medium under aerobic conditions, normally at a temperature in the range of about 20° C. to about 30° C. The components of the medium, namely, the steroid, buffering agent, halogenating enzyme, and hydrogen peroxide source are merely mixed with water and the resultant mixture agitated or shaken to assure adequate aeration for about ten to about two hundred minutes (optimally about thirty minutes to about 120 minutes).

Among the utilizable halide salts, the preferred salts are those of alkali metals, such as sodium bromide, potassium bromide, potassium chloride and sodium iodide. The salts are preferably present in excess of the stoichiometric amount required.

The following examples illustrate the invention (all temperatures being in centigrade):

EXAMPLE 1

16α-bromoestrone 3-methyl ether

To 300 ml. of a *Caldariomyces fumago* ATCC 11925 (American Type Culture Collection, Rockville, Md.) halogenating enzyme solution prepared by grinding 6 mycelial pads of the organism with 60 g. of acid-washed sand and 300 ml. distilled water in a Waring blendor for two minutes, then centrifuging, are added 60 ml. of 0.3% hydrogen peroxide, 300 mg. potassium bromide in 60 ml. distilled water, 120 ml. 0.3 M potassium phosphate buffer (pH 3.0), 300 mg. of 16-dehydro-estradiol 3-methylether 17-acetate in 24 ml. dimethylsulfoxide, and 36 ml. distilled water. The mixture is distributed in 200 ml. aliquots among three 500 ml. Erlenmeyer flasks and placed on a rotary shaker at 25° C. for thirty minutes. The reaction mixtures are pooled and extracted with 150 ml. chloroform which is dried with anhydrous sodium sulfate and concentrated at reduced pressure and room temperature. The concentrate is streaked on an 8-inch by 16-inch plate of silica gel GF (1.0 mm. thick) and chromatographed using benzene: chloroform (3:1). A band of ultraviolet absorbing material, less polar than the substrate, is scraped from the plate and eluted with several 10 ml. aliquots of chloroform:methanol (1:1). The chloroform:methanol extract is dried with anhydrous sodium sulfate, filtered and concentrated to dryness at reduced pressure and room temperature. A white crystalline material is obtained which is washed twice with n-hexane. The material was stored overnight under vacuum in a desiccator over phosphorous pentoxide. Yield of material is 30 mg. with a melting point of 172° to 174° C. (uncorr.) (Literature=173° to 175° C).

$\tau_{CDCl_3}^{TMS}$ 9.05 (S, 18-Me), 6.23 (S, 3-OMe), 5.46 (m, 16β-H)

*Analysis.*—Calc'd for $C_{19}H_{23}O_2Br$ (M.W. 363): C=62.81, H=6.38. Found: C=63.09, H=6.35.

The product is 16-bromoestrone 3-methyl ether.

EXAMPLE 2

17β-acetoxy-4β-bromo-5β-androstan-3-one

Substituting 3,17β-diacetoxy-5β-androst-3-ene for 16-dehydroestradiol 3-methyl ether 17-acetate of Example 1, the desired product is recovered.

EXAMPLE 3

17β-acetoxy-6β-bromo-androst-4-en-3-one

Substituting 3,17β-diacetoxyandrosta-3,5-diene for 16-dehydroestradiol 3-methyl ether 17-acetate of Example 1, the desired product is recovered.

EXAMPLE 4

2β-bromo17β-acetoxy-5α-androstan-3-one

Substituting 3,17β-diacetoxy-5α-androst-2-ene for 16-dehydroestradiol 3-methyl ether 17-acetate of Example 1, the desired product is recovered.

EXAMPLE 5

3α-acetoxy-16-bromo-5α-androstan-17-one

Substituting 3α,17-diacetoxy-5α-androst-16-ene for 16-dehydroestradiol 3-methylether 17-acetate of Example 1, the desired product is recovered.

EXAMPLE 6

3β-acetoxy-16-bromoandrost-5-en-17-one

Substituting 3β,17-diacetoxy-androst-5,16-diene for 16-dehydroestradiol 3-methyl ether 17-acetate of Example 1, the desired product is recovered.

EXAMPLE 7

3β-acetoxy-17α-bromoandrost-5-en-16-one

Substituting 3β,16-diacetoxy-5α-androst-16-ene for 16-dehydroestradiol 3-methyl ether 17-acetate of Example 1, the desired product is recovered.

EXAMPLE 8

1α-bromo-17β-acetoxy-5α-A-norandrostan-2-one

Substituting 2,17β-diacetoxy-5α-A-norandrost-1-ene for 16-dehydroestradiol 3-methyl ether 17-acetate of Example 1, the desired product is recovered.

EXAMPLE 9

6β-bromoprogesterone

Substituting 3-methoxypregna-3,5-diene-20-one for 16-dehydroestradiol 3-methyl ether 17-acetate of Example 1, the desired product is recovered.

EXAMPLE 10

16α-chloroestrone 3-methyl ether

By utilizing potassium chloride in lieu of potassium bromide in Example 1, the product recovered will be 16α-chloroestrone 3-methyl ether.

EXAMPLE 11

6β-bromotestosterone

Substituting 3-ethoxy-17β-hydroxy - androsta-3,5-diene for 16-dehydroestradiol 3-methyl ether 17-acetate of Example 1, the desired product is recovered.

The invention may be variously otherwise embodied within the scope of the appended claims.

What is claimed is:

1. A process for preparing halo steroids which comprises reacting an enolic ether steroid having the formula

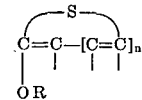

wherein R is acyl or alkyl; S is a steroid residue and n=0 or 1 with a halide in the presence of hydrogen peroxide and a microorganism of the species *Caldariomyces fumago* and recovering therefrom the halo steroid of formula

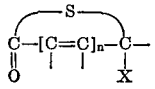

wherein S and n are defined above and X is halogen.

2. A process in accordance with claim 1 wherein the enolic ether steroid is selected from the group consisting of $\Delta^{16}$-17-acyloxy steroids; $\Delta^{16}$-17-alkyloxy steroids; $\Delta^3$-3-alkoxy steroids; $\Delta^3$-3-acyloxy steroids; $\Delta^2$-3-alkyloxy steroids; $\Delta^2$-3-acyloxy steroids; $\Delta^{16}$-16-acyloxy steroids; $\Delta^{3,5}$-3-acyloxy steroids; $\Delta^1$-2-acyloxy steroids and $\Delta^{3,5}$-3-alkyloxy steroids.

3. A process in accordance with claim 1 wherein the steroid is selected from the group consisting of 16-dehydroestradiol-3-methyl ether 17-acetate; 3,17β-diacetoxy-5β-androst-3-ene; 3,17β-diacetoxyandrosta-3,5-diene; 3,17β-diacetoxy-5α-androst-2-ene; 3α,17-diacetoxy-5α-androst-16-ene; 3β,17-diacetoxyandrost-5,16-diene; 3β,16-diacetoxy-5α-androst-16-ene; 2,17β-diacetoxy-5α-A-norandrost-1-ene; 3-methoxypregna-3,5-diene-20-one; 3-methoxyandrosta-3,5-diene-17-one; and 3-ethoxy-17β-hydroxyandrosta-3,5-diene.

References Cited

UNITED STATES PATENTS 3,365,467   1/1968   Diassi et al. _____ 195—51

ALVIN E. TANENHOLTZ, Primary Examiner